Feb. 22, 1944. W. G. WHITSITT 2,342,440
MOLDING APPARATUS
Filed Sept. 23, 1942 3 Sheets-Sheet 1
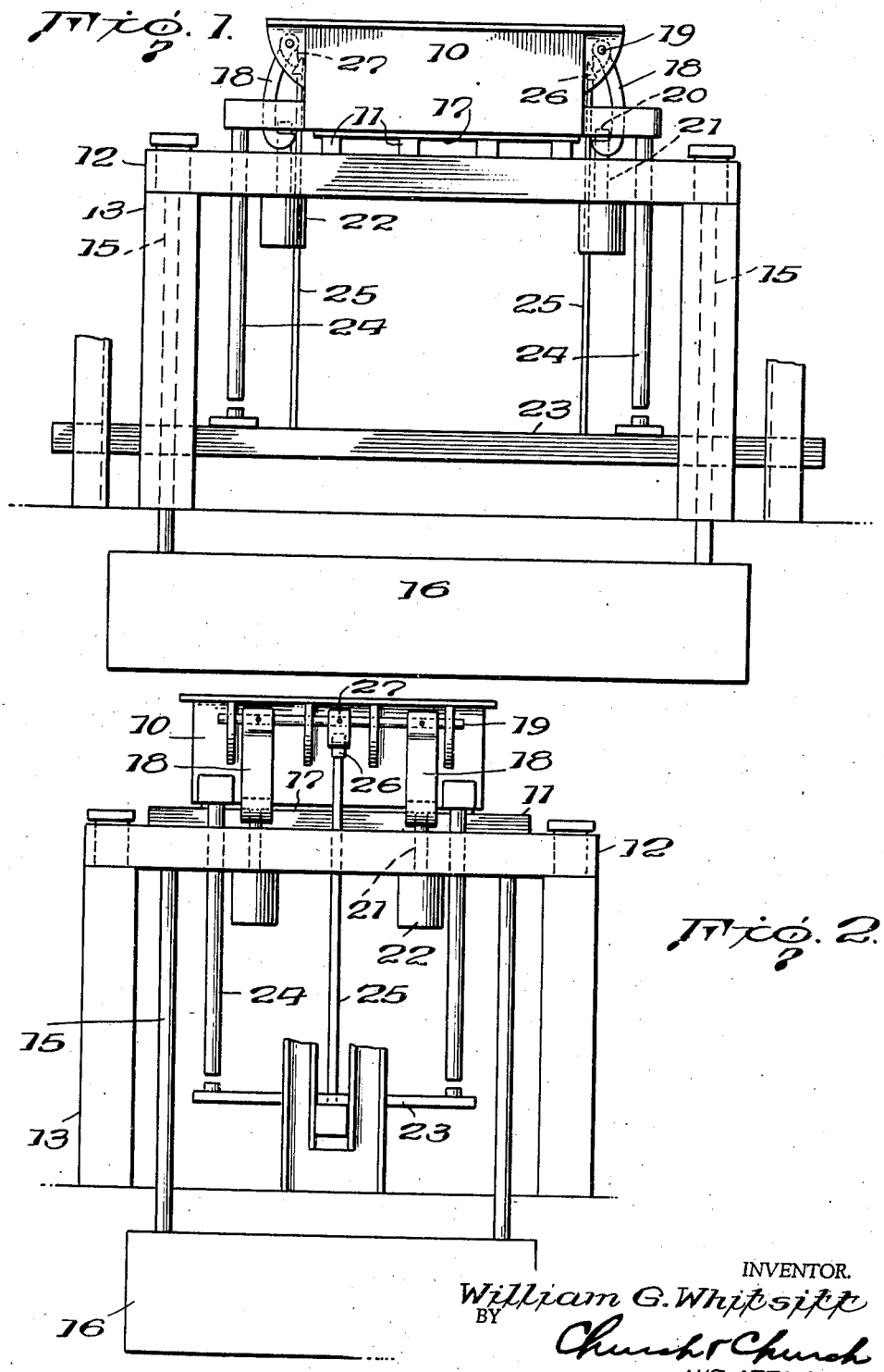
INVENTOR.
William G. Whitsitt
BY
Church & Church
HIS ATTORNEYS Feb. 22, 1944.　　W. G. WHITSITT　　2,342,440
MOLDING APPARATUS
Filed Sept. 23, 1942　　3 Sheets-Sheet 2

INVENTOR.
William G. Whitsitt
BY Church & Church
HIS ATTORNEYS

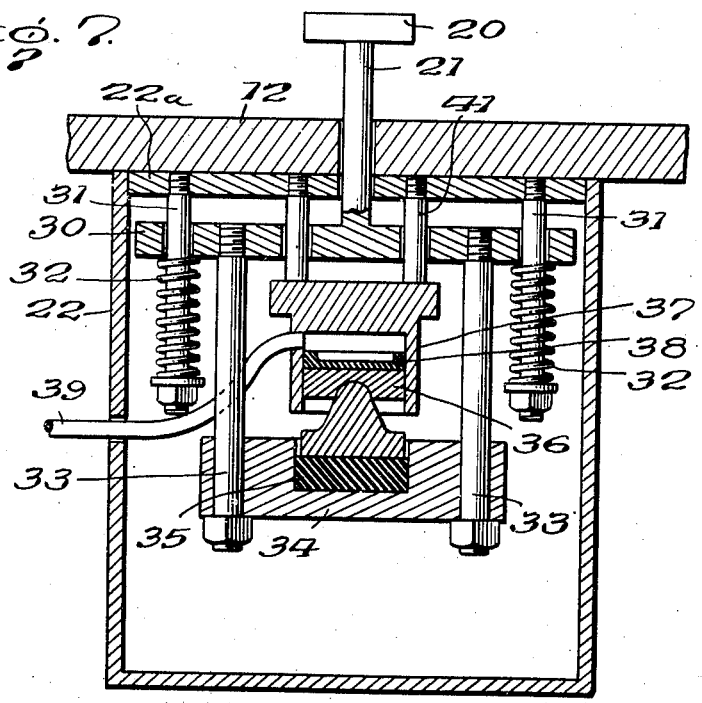
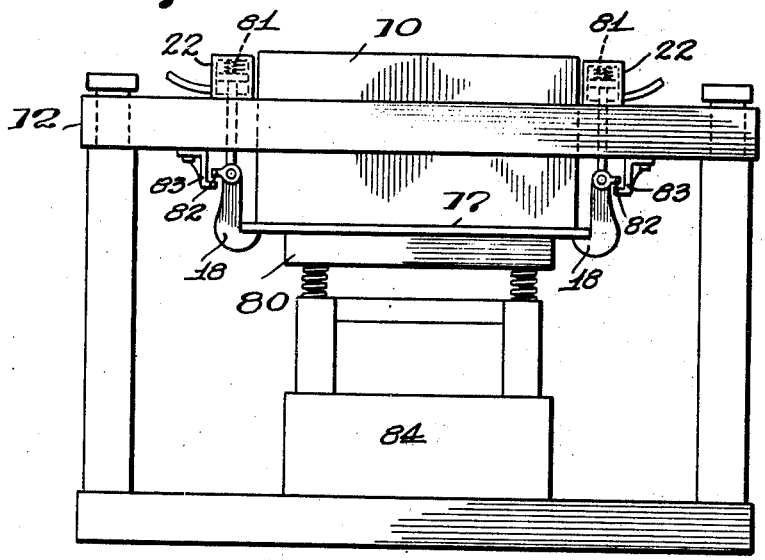

Patented Feb. 22, 1944

2,342,440

UNITED STATES PATENT OFFICE 2,342,440

MOLDING APPARATUS

William Gambill Whitsitt, Nashville, Tenn.

Application September 23, 1942, Serial No. 459,409

13 Claims. (Cl. 25—41)

This invention relates to improvements in molding apparatus and particularly to devices for clamping articles to be vibrated to or against vibratory supports for molding bodies such as concrete blocks and like bodies.

The primary object of the invention is to provide a clamping device with which an article or body to be vibrated can be firmly secured to a vibrating base or support and released from that support with a minimum loss of time.

More specifically, the invention contemplates a clamping mechanism for firmly securing a mold or mold box for forming precast articles such as concrete blocks on a vibrating base or support, while permitting the mold box to be readily released for removal from the molded body in a minimum period of time.

Another object of the invention is to provide fluid pressure operated devices for clamping an article such as a mold box on or to the vibrating base, whereby maximum efficiency will be obtained, so far as concerns the firm retention of the article on the base, particularly during those portions of the cycle of operations where the direction of movement of the vibrating base is reversed and the base tends to move away from the box or other object secured thereon.

A still further object of the invention is to provide a molding machine wherein materials such as concrete are molded into precast bodies such as blocks, and wherein the mold unit or mold box is stripped from the molded body while the latter still rests on the vibrating base, this movement of the mold box upwardly from the base being effected by mechanism which is also utilized for disengaging the clamping instrumentalities.

With these and other objects in view, the invention consists of certain details of construction and combinations and arrangements of parts, all as will hereinafter be more fully described and the novel features thereof particularly pointed out in the appended claims.

In the accompanying drawings illustrating the preferred embodiment of the invention—

Figure 1 is an end view of a concrete block molding machine embodying the present improvements;

Fig. 2 is a side elevational view;

Fig. 7 is a sectional view illustrating the interior construction of one of the hydraulic cylinders used for clamping the mold box on its vibratory support.

Fig. 8 is a diagrammatical illustration of a modified form of apparatus wherein the pallet or bottom closure for the mold box is clamped to said box which is rigid on the vibratory support.

Figure 3:
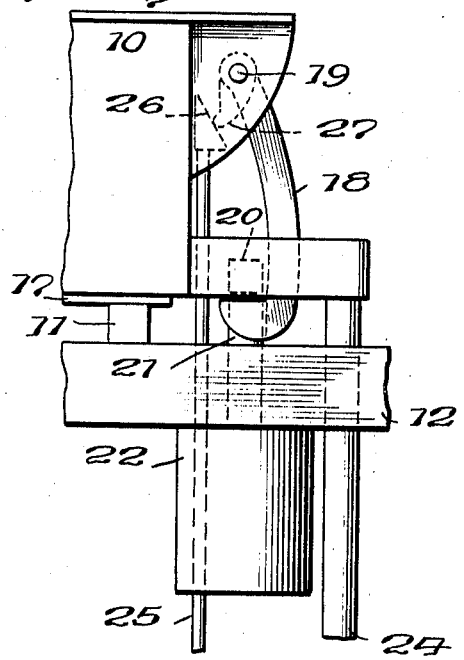
Fig. 3 is a detail elevational view illustrating the clamping devices in operative position.

A concrete block molding machine has been adopted for purposes of illustration as the present invention has been especially designed for use on machines of this type, but, of course, the usefulness of the present clamping devices is not necessarily limited to this exact type of machine. It will become apparent from the following description that the present clamping devices can be utilized in combinations with various types of vibratory supports and articles which it is desired to temporarily secure on those supports.

In the concrete block molding machine illustrated in Figs. 1 to 7, the mold box 10 is adapted to rest on, so-called, pallet bars 11 mounted on the vibrating table 12, and the table is capable of vertical vibratory motion with respect to the machine base 13. The table is guided in such movements by the vertical bearings, rigid on base 13. Vibratory motion is imparted to the table or mold support 12 through connecting rods 15 from a vibrating mechanism illustrated diagrammatically at 16. In accordance with the usual practice, the lower end of the mold cavity is closed by a pallet 17 interposed between the bottom of the mold and the pallet bars 11. Where bodies such as concrete blocks are molded by vibrating the mold box and its support, the concrete is compacted in the mold cavity to such degree that the mold can be removed from the molded body preparatory to the actual curing process. This method of manufacture has been found to be more economical than in other methods in common use today, due to a reduction in the molding time, as well as to a reduction in the quantity of cement content required for any given strength. Also, the dimensions and appearance of the vibrated, molded product are more consistent than can be obtained by other methods, such as mechanical tamping. However, considerable difficulty has been experienced in firmly securing the mold box on its supporting table while, at the same time, permitting ready or almost instantaneous release of the mold box for stripping from the molded body. For instance, if the mold box and pallet are clamped to the vibrating table with sufficient firmness to prevent escape of the material through the space that intermittently or periodically occurs between the bottom edge of the mold and the pallet, then the clamping action is such that the mold cannot be readily released. On the other hand, where the clamping devices are such as to permit ready stripping of the mold from the molded body, the machine suffers a loss in operating efficiency, due to the fact that considerable material escapes from between the bottom edge of the mold box and the pallet. Again, if the clamping action is such as to allow ready disengagement of the clamping means, it has been found that tremendous stresses are imposed on the clamping devices, especially at that point in the cycle of operations where the vibrating table reaches its upward limit of movement and its direction of movement is reversed, because, under these conditions, the mold, under the influence of inertia, tends to continue to rise while the direction of movement of the table is reversed. In the present apparatus, all these difficulties are overcome by utilizing fluid-actuated devices for effecting the clamping action. Preferably, the vibrating table and mold box are provided with latches adapted to releasably engage the movable members of a plurality of hydraulic cylinders, whereby, upon the application of fluid pressure supplied to the cylinders, the latches can be firmly retained in locking position. For purposes which will hereinafter appear, it is deemed preferable to provide the latches on the mold box in position to engage the pistons in the hydraulic cylinders which are carried on the vibrating table, although it will be apparent that the location and mounting of these instrumentalities may be varied without departing from the spirit of the present invention.

Figure 4:
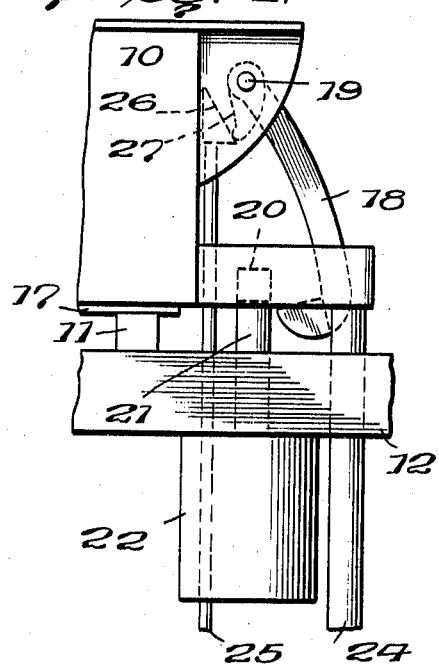
Fig. 4 is a similar view with the clamping devices disengaged.
Figure 5:
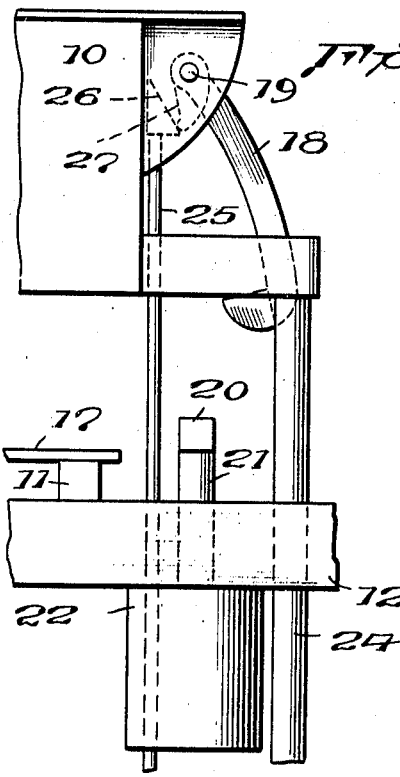
Fig. 5 is a similar view illustrating the mold box raised up from the vibrating base for stripping it from the molded block.
Figure 6:
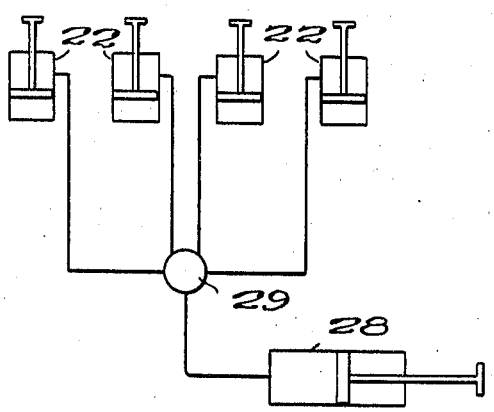
Fig. 6 is a diagrammatic illustration of the operating connections for the clamping devices.

For instance, the latches 18, usually two at each side of the machine, are mounted on shafts 19 journaled in suitable brackets on the exterior mold wall, and these latches are free to move by gravity to the position shown in Fig. 3, wherein the bill or hook of each latch member is positioned beneath cross arms 20 on the piston rods 21 of the hydraulic cylinders 22. The hydraulic cylinders are mounted on the vibrating table 12, and upon the supply of fluid under pressure to the cylinders 22 the piston rods 21 are adapted to be depressed so that the cross arms 20 thereof will move down and firmly engage the hook-shaped latches 18. In this manner, the mold box, together with the pallet 17 beneath it, will be firmly clamped down against the pallet bars 11. After the table and mold have been vibrated sufficiently to properly compact the contents of the mold, pressure in the cylinders 22 is relieved preliminary to raising the mold with respect to the pallet and table for stripping the mold from the molded block. For effecting this stripping of the mold, there is a cross bar 23 movable vertically in the machine base by means such as a foot pedal (not shown), and said bar, when raised, is adapted to engage stripping rods 24 depending from the mold box, so as to elevate the latter. However, before the mold box can be elevated, it is necessary that the hook latches 18 be fully disengaged from the hydraulic cylinder piston rods and, for this purpose, the cross bar 23 also carries vertical bars or rods 25 which are provided at their upper ends with cam members 26 adapted to engage crank arms 27 on the shafts 19 on which the hook latches 18 are mounted. The length of the rods or bars 25 is such, compared with the spacing of the operating cross bar 23 and the stripping bars 24, that the cam members 26 will engage the crank arms 27 somewhat in advance of the engagement of the stripping rods 24 by the cross bar 23. In this way, the cams 26 will swing the hook latches 18 out of engagement with the piston rods 21 in advance of the cross bar 23 engaging the stripping rods 24 and, as a consequence, the mold box will then be free to be elevated and stripped from the molded concrete block. The position of the latching hooks when swung clear of the piston rods is illustrated in Fig. 4 and the position of the mold box when raised to permit removal of the molded block is illustrated in Fig. 5. With the mold box raised as illustrated in Fig. 5, the pallet 17 with the molded block resting thereon is removed from the machine and another pallet placed on the pallet bars, so that the mold can then be lowered and filled with another increment of concrete, preparatory to the next molding operation.

As previously stated, the mold box 10 is provided with two of the latching hooks 18 at two of its opposite sides, so that there is a hook at substantially each corner of the mold box. This, of course, requires four hydraulic cylinders, one for each of the hooks, and these four cylinders, together with a master cylinder, are illustrated diagrammatically in Fig. 6. The master cylinder 28 may be actuated in any desired way, for instance, by a foot pedal, not shown, and said master cylinder is connected to a distributor valve 29 from which the fluid under pressure is fed to the several operating cylinders or, so-called, slave cylinders 22. To facilitate disengagement of the latching hooks 18 from the cross heads of the piston rods, the slave cylinders each embodies means for relieving the pressure of the cross heads 20 on the hooks 18, when the pressure in the cylinders 22 is relieved. As illustrated in Fig. 7, each slave cylinder has its piston rod 21 carried on a cross bar 30 slidable within the cylinder 22 on guide members 31. Coil springs 32 on the guide members 31 tend to urge the cross member 30 and piston rod 21 upwardly, so that, in the absence of fluid pressure tending to draw the piston rod 21 downwardly, these springs will cause the piston rod 21 to rise slightly, so as to normally hold them spaced a short distance from the hook portion of the latches 18, as illustrated in Fig. 3. In this way, the latches can be freed so as to be disengaged from the cross heads of the piston rods with a minimum application of power. Reverting to the construction of the operating cylinders and their piston rods, the cross member 30 carrying piston rod 21 also has secured thereto bolts 33 which carry a yoke plate 34, and supported on this yoke plate is a rubber member 35 engaging a piston 36 in an interior cylinder 37. A rubber cup 38 seals this cylinder chamber 37 against the escape of fluid which is delivered by connection 39. With this construction, when fluid under pressure is delivered to the interior cylinder 37, the piston 36 and yoke 34 will be depressed, as viewed in Fig. 7, so as to lower the cross member 30 and the piston rod 21 to clamp the cross heads 20 of the several operating cylinders against the latching hooks 18. All forces opposing the downward pressures exerted on piston 36 are transmitted directly to the vibrating table 12 through pins 41 interposed between the base of interior cylinder 37 and the end wall 22a of the operating cylinders, it being understood that these end walls are normally seated against the under surface of the vibrating table and that the piston rods 21 work in apertures in the table. The rubber member 35, which, in effect, constitutes a portion of the piston 36 of the interior cylinder 37, is preferably included in this construction to obsorb a portion of the movement of the main piston rods 21 caused by the vibration of the machine, before this movement reaches the actual hydraulic system. Although this rubber pad 35 does not absorb all of the movement transmitted back from the vibrating table, it absorbs a portion of it and, to that extent, serves as a "damper."

With the present construction, the mold box can be firmly or solidly positioned on the vibrating table and destructive forces present in other machines are substantially totally eliminated. At the same time, the clamping action is such that it may be relieved so quickly as to not interfere with the efficient operation of the molding apparatus as a whole in the production of the molded blocks or whatever articles are being produced. At the same time a maximum efficiency of vibration of the mold box and pallet, operating as a single unit, is obtained so that the molded product will have imparted to it the maximum vibrating packing stresses. It will be appreciated that the feature of clamping the mold box to the table under pressure yieldingly resisted by springs 32, which permits substantially instantaneous release of the mold box when that pressure is relieved, is not limited to the specific form of actuating mechanism shown in the present instance (hydraulic cylinders) but may be readily incorporated in other types of clamping devices wherein the latch is engaged by one of a pair of members which are capable of a yielding, relative movement.

In the form of apparatus illustrated in Fig. 8, the mold box 10 is rigid on the vibratory supporting table 12 and the pallet 17 is adapted to be raised by a pallet table 80 up against the bottom of the mold box against which it is clamped by the fluid actuated instrumentalities previously described. For instance, the cylinders 22 may be mounted on the vibratory table 12 and the hooks 18 pivotally attached to the piston rods 21 may engage the under side of the pallet. In the absence of fluid pressure in cylinders 22, springs 81 within the cylinders press the piston rods, and hooks carried by the rods, downwardly, so that lugs 82 on the hooks engage abutments 83 on the table 12 to swing the hooks 18 outwardly from the edge of the pallet. This would be the normal position of the hooks in order not to interfere with the pallet being raised up to a close-fitting contact with the bottom of the mold box. However, after the pallet has been positioned against the mold box, fluid pressure is supplied the several cylinders 22, whereupon the pressure of springs 81 is overcome and the piston rods and hooks raised. As the hooks are raised, they will swing inwardly and engage under the pallet as soon as the lugs 82 move out of engagement with abutments 83, after which further upward movement of the piston rods will cause the pallet to be firmly clamped against the mold box. Mechanism, of conventional form, for raising and lowering the pallet table 80 is indicated diagrammatically at 84. Any conventional means for vibrating the mold box table may be utilized and, as such mechanism constitutes no part of the present invention, none is shown or described. After the pallet has been clamped against the box, upward pressure on the pallet table may be relieved so that the pallet table will not absorb or tend to dissipate the vibratory forces imposed on the mold box and pallet. In other words, the mold box and pallet are vibrated as a unit, together with the table 12, independently of the pallet table. In this construction, it will be understood that, after the block has been molded, the pallet is released and lowered so that the stripping is effected by the molded block being pressed downwardly out of the mold box by a pressure head (not shown).

What I claim is:

1. In a molding machine comprising a mold, a support for said mold, means for vibrating said support and means for raising said mold above the support to strip it from an object molded in the mold the combination of a plurality of cylinders mounted on the support, a fluid actuated piston in each cylinder, and latches carried by the mold engageable with said piston to clamp the mold to its support, said latches being disengageable from the pistons by said mold stripping means.

2. In a molding machine comprising a mold, a support for said mold, means for vibrating said support and means for raising said mold above the support to strip it from an object molded in the mold, the combination of a plurality of cylinders mounted on the support, a fluid actuated piston in each cylinder, latches carried by the mold engageable with the pistons to clamp the mold to the support, and means for disengaging said latches to permit stripping the mold from the molded object.

3. In a molding machine comprising a vibrating support and a mold, the combination of a plurality of cylinders on one of said two elements, each cylinder having a fluid actuated piston therein, and latching means carried by the other of said two elements engageable with said pistons for clamping said two elements together by the pressure of the fluid on said pistons.

4. In a molding machine comprising a vibratory support and a mold, the combination of a plurality of cylinders carried on one of said two elements, a piston in each cylinder, fluid supply connections for effecting relative movement of the cylinders and their respective pistons, and means carried by the other of said two elements for latching the same to the movable portions of said cylinders and pistons.

5. In a molding machine comprising a vibratory support and a mold, the combination of a plurality of cylinders on said support each having a fluid actuated piston therein, means on said mold engageable with said pistons, for clamping the mold and support together upon application of fluid pressure to the pistons, means for releasing said clamping means when said pressure is relieved, and means for disengaging said clamping means from the pistons.

6. In a molding machine, a vibratory support and a mold, latches pivoted on said mold, fluid actuated devices on said support comprising members engageable by said latches and movable relatively to the support and mold for clamping the same together under fluid pressure, and means for rocking the latches on their pivotal centers to disengage them from said fluid actuated devices.

7. In a molding machine, a vibratory support, a mold, a plurality of hydraulic cylinders each having a piston therein, latches movable into and out of engagement with said pistons for clamping the mold on the support, means for elevating said mold with respect to its support, and means operable by said elevating means for moving the latches out of engagement with said pistons.

8. In a molding machine, a vibratory support, a mold, a plurality of hydraulic cylinders on the support each having a fluid actuated piston therein, shafts journaled on opposite sides of the mold, latches on said shafts adapted to interlock with said pistons for clamping the mold on its support, and means for rocking said shaft to disengage the latches and pistons.

9. In a molding machine, a vibratory support, a mold, a plurality of hydraulic cylinders on the support each having a fluid actuated piston therein, shafts journaled on opposite sides of the mold, latches on said shafts adapted to interlock with said pistons for clamping the mold on its support, means for elevating the mold off the support, and means operable by said mold elevating means for rocking said shaft to disengage the latches and pistons.

10. In a molding machine, a vibratory support, a mold box on said support, said box being open at its bottom, a closure for the bottom of said box, and fluid actuated means for clamping said support, box and closure together, said clamping means comprising a plurality of cylinders on one of said members, each cylinder having a reciprocatory piston therein, and latches on a second of said members adapted to be releasably interlocked with said pistons to releasably clamp said table, box and closure together as a unit.

11. In a molding mechanism, a vibratory support, a mold, means for vibrating said support and mold, co-operating clamping elements attached to said mold and support, pressure actuated means for securing the clamping elements together to clamp the mold to the support, and means yieldingly resisting the pressure with which said elements are clamped together, said co-operating clamping elements being disengageable from each other by said pressure resisting means when the clamping pressure on said elements is relieved.

12. In a vibrating mechanism, a vibratory mold box, a closure for one side of said box, pressure actuated clamping elements attached to said mold box engageable with said closure to clamp the box and closure together as a unit, and means yieldingly resisting the pressure with which said mold box and closure are clamped together, said clamping elements being movable to their disengaged position to release said box and closure when the clamping pressure is relieved.

13. In a clamping mechanism for releasably securing an article to a vibratory support, co-operating clamping elements engageable with each other for clamping said article to said support, pressure actuated means for securing said elements together in engagement with each other, and means yieldingly resisting the pressure with which said elements are held in engagement with each other, one of said co-operating elements being releasable from the other by said pressure resisting means when the pressure on said elements is relieved.

WILLIAM GAMBILL WHITSITT.